March 9, 1926.
S. BARLOW
1,576,079
FUEL FEED CONTROL FOR AUTOMOTIVE ENGINES
Filed Sept. 26, 1925 2 Sheets-Sheet 1
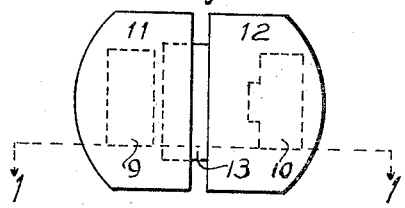
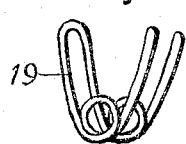
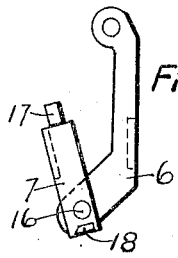
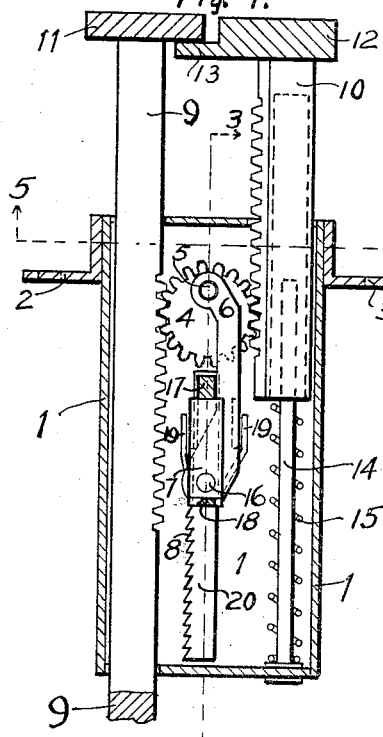
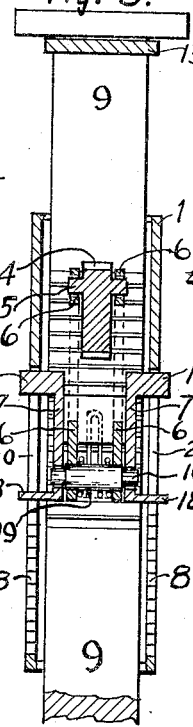
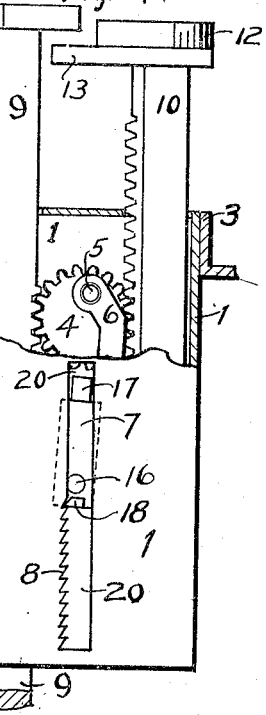
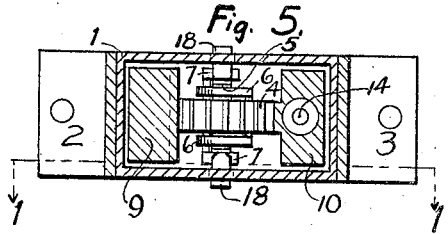
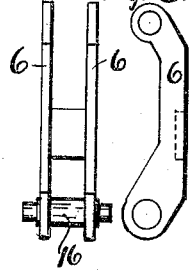
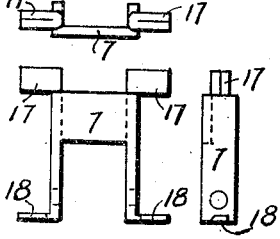
INVENTOR.
Simon Barlow March 9, 1926.                                              1,576,079
                          S. BARLOW
              FUEL FEED CONTROL FOR AUTOMOTIVE ENGINES
                    Filed Sept. 26, 1925      2 Sheets-Sheet 2
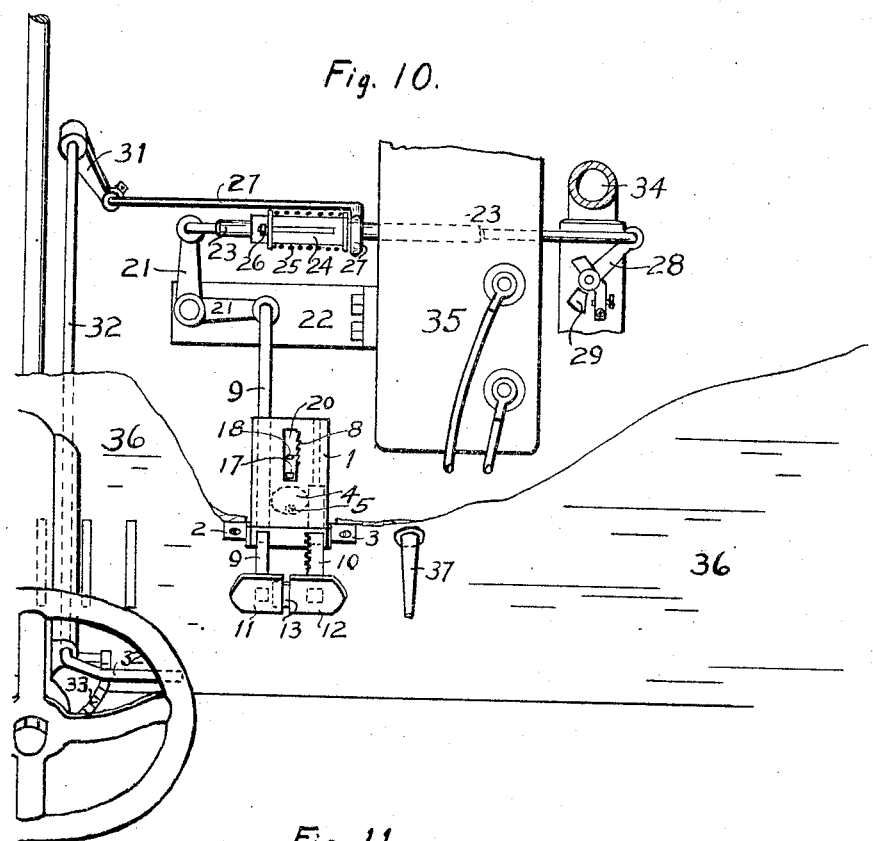
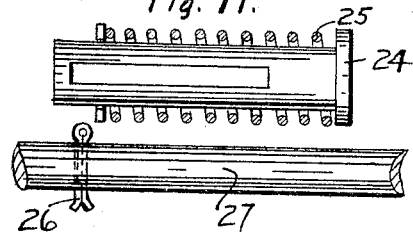
INVENTOR.
Simon Barlow Patented Mar. 9, 1926.

1,576,079

UNITED STATES PATENT OFFICE.

SIMON BARLOW, OF OGDEN, UTAH.

FUEL-FEED CONTROL FOR AUTOMOTIVE ENGINES.

Application filed September 26, 1925. Serial No. 58,874.

*To all whom it may concern:*

Be it known that I, SIMON BARLOW, a citizen of the United States, residing at Ogden, in the county of Weber and State of Utah, have invented new and useful Improvements in Fuel-Feed Controls for Automobile Engines, of which the following is a specification.

My invention relates to improvements in foot-throttle mechanisms, otherwise known as accelerators, as applied to automotive engines, and the objects of my invention are:

First,—to provide means by which the idling, or slow-moving, fuel supply to the engine, which is regulated in automotive engine installations usually by hand throttle lever and occasionally by cowl-board pull rod, or not at all, may also be shut off and regulated by the foot throttle, thereby to enable the use of the engine as a brake effectively at and down to the lower speeds, without need of disturbing the hand-throttle setting or the permanent setting, whichever may be in use.

Second,—to provide means in connection with the foot-throttle, or accelerator, of automotive engines, by which, with a slightly uneven pressure of the foot, causing an uneven reciprocation of the parts, the operator may cause the foot-throttle to lock in its then position, whatever position that may be, thus enabling the operator, by such slight uneven pressure of the foot to one side, to hold the foot-throttle in repose against variation of up-and-down foot-pressure due to undulations in the road traveled, and providing relief from nervous and muscular strain of holding the foot-throttle at a certain up-in-space position in order to hold a uniform engine speed.

And, what I wish to designate as a third object is, to provide means of carrying out the foregoing two objects with what may be a single mechanism.

The primary objects hereinbefore designated are identical with the objects named in my application, Serial Number 19,702, filed March 31, 1925, except that in object designated as the second the mode of operation is stated somewhat differently, for this somewhat different mechanism.

The objects of this mechanism as against the mechanism described in my application Serial No. 19,702, filed March 31, 1925, is to provide a mechanism carrying out the same three primary objects as that mechanism, but which may be—

First,—applied to the ordinary automobile of today without any change in its hand-throttle connecting linkage or its foot-throttle connecting linkage, other than the addition of a spring to make an elastic sliding connection instead of a solid sliding connection between the hand and foot-throttle (elastic in one direction, sliding in the other direction); that is to say, a mechanism which will give the reverse throttle action at any point in the travel of the foot-throttle mechanism as held by a setting of hand or dash throttle of the usual machine of today, and therefore adapted to such a machine, without the provision of a connecting mechanism such that the foot-throttle is not influenced by the hand throttle as provided in my other application hereinbefore mentioned.

Second,—which will function as a stop mechanism at any point instead of at points beyond the off foot-throttle position, with the same uneven foot pressure.

Third,—which may be of proportionately heavier construction in some of its working parts.

I attain these objects by the mechanism illustrated in the accompanying two drawings, in which—

Figure 1 is a vertical section on line 1—1, Figures 2 and 5, of the entire device with the exception of an additional spring added to the hand and foot-throttle connecting means of the usual automobile. Figure 2 is a plan view of Figure 1, showing the foot plates and stop that prevents left plate from moving down without the right plate being carried with it. Figure 3 is a side-view section of Figure 1, on the line 3—3. Figure 4 is a view similar to Figure 1, with part of the outside cover removed and showing the parts in the locked position and also in the position they assume at the commencement of the reverse action upon the foot-throttle linkage. Figure 5 is a plan-view section of Figure 1, on line 5—5. Figure 6 is a view in perspective of the fulcrum-and-check yoke spring. Figure 7 is a side elevation of the fulcrum-and-check yoke assembly except the spring, Fig. 6. Figure 8 is a combination left-hand side view and front view of the fulcrum part of the fulcrum-and-check yoke.

Figure 9 is a detail of the check or catch part of the fulcrum-and-check yoke. Figure 10 is a plan view, partly in section and partly in perspective, of the entire device, connected with the carburetor and co-operating hand-throttle connections of an automobile. Figure 11 is a detail illustration of the additional spring used, and of a check sleeve which may be used to restrict the action of such spring, as shown in Figure 10. Figure 12 is a detail of the usual sliding connecting between the foot and hand-throttle linkages.

Similar numerals refer to similar parts throughout the several views.

The shell, or frame, 1, Figures 1 and 10, secured either rigidly or by universal connecting to the foot-board 36 of an automobile, or in fact placed at any point below or in front of the foot-board 36, to which connections can be run to the usual foot-throttle position, constitutes the frame work of the mechanism comprising my invention. In such shell the push-rods 9 and 10 reciprocate. Push-rod 9 is here integral with foot-plate 11, but may be connected otherwise thereto,—it bears certain gear teeth upon its inner side, and by such gear teeth is always in mesh with gear wheel 4, and is connected through bell-crank 21 and rod 23 with the carburetor valve crank-arm 28. Any movement whatever of push-rod 9 is transmitted to crank-arm 28.

The coil spring 15, Fig. 1, acting upon the push-rod 10, and through the stop 13, upon push-rod 9 and its connections, will, either alone or with the aid of a slight additional spring force put elsewhere in the linkage to the carburetor, return the through foot-throttle push-rod 9 and its connections, including 28, Fig. 10, to the closed foot-throttle position after any depression of foot-plate 11 and such rod 9.

The closed foot-throttle position, however, on the ordinary automotive installation of today, is a relative position, and one which is determined by the hand-throttle or cowl-board throttle setting. Such setting of the hand throttle in most installations pulls down the foot-throttle to the extent of the carburetor valve opening thereby maintained.

In Figure 10, take foot-plate 11, push-rod 9, bell-crank 21, and pull-rod 23, and you have substantially the foot-throttle and connections of an ordinary automobile of today. Run pull-rod 23 through any kind of sliding connection, and put on it a stop 26, and connect it to a hand-lever 32, through a crank 31, and you have substantially the hand-throttle or dash throttle as it is interlocked with the foot-throttle mechanism of an ordinary automobile of today.

As an elastic but at the same time definite connection between the hand-throttle and the foot-throttle linkages, Fig. 10, the spring 25, with or without check sleeve 24 to check any extension of such spring but not its compression, is used. Any closing of the carburetor valve through a pulling by rod 9 and a consequent pushing upon rod 23, compresses the spring 25 and slides the sleeve 24 along rod 23, over the stop pin 26, which slides in a slot in sleeve 24. The spring 25 has a tension force somewhat in excess of spring 15 or any set of springs acting in the same direction upon the linkage as spring 15 acts, but the tension of spring 25 is to be less than any force necessary to move hand-lever 32 in any installation in which my invention is used. On a dash throttle, catches are used on such a lever as 32, and no drag is needed. When sleeve 24 is used, the spring 25 may be held under tension upon it if desired, limited by pin 26 and the shoulder of the sleeve. The tension strength of spring 25 is such that the carburetor valve may be opened positively, as in ordinary installations, by the pulling of rod 27 upon rod 23, and may be regulated by the hand or dash throttle.

The push-rod 9, already described, is shown in detail in Figures 1, 3, 4 and 10.

The push-rod 10 is here integral with foot-plate 12 and stop 13, but may be connected otherwise thereto,—it bears certain gear teeth upon its inner side, and by such gear teeth is always in mesh with gear wheel 4. When depressed, this push-rod compresses the coil spring 15, over the guide-rod 14.

The gear wheel 4 has an off-center shaft 5, only, with no center shaft. The shaft 5 has a bearing at each of its ends in the two sides of the fulcrum part 6 of the fulcrum-and-check yoke assembly, Fig. 7, and the gear 4 and its shaft 5 remain at all times thus locked with and a part of the fulcrum-and-check yoke assembly and also in mesh, by the teeth of the gear wheel, with the push rods 9 and 10 respectively, as is best illustrated by Figures 1 and 3.

The unit I have designated as the fulcrum-and-check yoke consists of the arms 6 and shaft 16, shown in Fig. 8; also of the part 7, Fig. 9, bearing the guide lugs 17 and the ratchet pawl lugs 18; and of the spring 19, Fig. 6, which is so tensioned as to hold the arms 6 in parallelism with a plane passing through the center of shaft 16 and the center of guide-lugs 17,—in other words, so arranged as to hold the yoke closed unless opened by some stronger force.

In each side of the housing 1, Figures 1, 3 and 4, there is a slot 20, bearing at its upper end guide surfaces between which the lugs 17 of the yoke assembly slide, and bearing at its lower end ratchet teeth, on one side of the slot only, of suitable size to be engaged by a tooth or teeth on lugs 18 of the yoke assembly, Fig. 7. By engagement against the guide lugs 17, the top of this slot 20 also acts as a stop to prevent further upward movement of the fulcrum-and-check yoke and of the gear wheel 4 and its connections.

I press foot-plate 11, connected to push-rod 9, with the foot, or press both plate 11 and plate 12, simultaneously. They will both go down, and the entire mechanism will function as a simple foot throttle and open the carburetor valve through its crank 28. Foot-plate 11 is slightly thicker that foot-plate 12, and plate 11 is on the side nearest the operator's seat. Check-piece 13 is a stop, and imparts to foot-plate 12 and to push-rod 10 any downward motion of foot-plate 11. When push-rods 9 and 10 are caused thus to move downward, the gear wheel 4 is not caused to rotate, since there is no uneven motion of rods 9 and 10, and there is no rotation of the fulcrum-and-check yoke assembly, Figures 1 and 7, about the guide lugs 17, which are free to slide in the slot 20 of housing 1, and consequently there is no engaging of the ratchet lugs 18 with the slot teeth 8. Therefore, the gear wheel 4 and the fulcrum-and-check yoke assembly attached by eccentric shaft 5 to the gear wheel 4 all will move freely down with the push rods 9 and 10. The spring 15, acting through rod 10 and stop 13, will return the parts to normal off foot-throttle position after release of any foot pressure.

Figures 1, 3 and 10 show the position of the parts of my mechanism at the closed-throttle position of the foot mechanism. I will call this the closed foot-throttle position of the parts.

With the foot-throttle in such closed position, and the push-rods 9 and 10 and foot-plates 11 and 12, respectively, in the relative positions illustrated by Figures 1, 2, 3 and 10, then I slide the foot to the right against stop 37, Fig. 10, or, at any rate with the foot missing or sliding off plate 11, I depress foot-plate 12 only. The rod 10 is connected to foot-plate 12, and is in mesh by gear teeth with gear wheel 4, as hereinbefore mentioned. Upon a slight depression of foot-plate 12, the rod 10 will rotate the gear wheel 4 upon push-rod 9. The eccentric shaft 5 of gear wheel 4 will then, as illustrated by Fig. 4, exert a force upon the fulcrum arms 6 of the fulcrum-and-check yoke, Fig. 7, tending to spread the part 6 from the part 7, as shown by Fig. 7, the reaction to such effort coming upon the right-hand side walls of the slots 20, through the guide lugs 17, integral with part 7 of the yoke. This spreading force will rotate the fulcrum-and-check yoke about the lugs 17 as a center and cause the ratchet lugs 18 to engage the teeth 8 in slots 20, at whatever position in the slot 20 the ratchet lugs may be, top, middle, or bottom, corresponding with any position at which the setting of the hand throttle of an automobile having these connecting linkages may hold the foot-throttle. The purpose, as will be seen, of the capacity of the parts 6 and 7 to spread, about their hinge 16, and of the spring 19 to hold them in the closed position, is to permit the gear wheel 4 and its eccentric shaft 5 to continue to rotate while the guide lugs 17 impinge against the walls of the slots 20 and the ratchet teeth 18 continue to engage the teeth 8 of the slots 20, and to allow such ratchet teeth to remain engaged for the purposes intended, until released by the action of the gear shaft 5 rotating the fulcrum-and-check yoke about the lugs 17 in the opposite or disengaging direction.

With the ratchet lugs 18 of the fulcrum-and-check yoke thus engaged in the teeth 8, of the slots 20, as illustrated in Figure 4, any further or continued depression of push-rod 10 alone, below the position shown in Figure 4 will impart a reverse or upward motion to the push-rod 9 and all its connections, somewhat greater than such further downward motion of push-rod 10 beyond the point illustrated by Figure 4. The greater movement thus imparted to push-rod 9 is due to the unequal leverage through the gear 4, rotating upon its eccentric shaft 5, with the shorter side adjacent to push-rod 10.

The amount of reverse motion by this means imparted to the foot-throttle mechanism, through push-rod 9, is calculated to close the carburetor valve entirely against any supply of gas needed for idling or slow running and against any ordinary setting of hand or dash throttle when they are used in the usual way as auxiliary controls, and is calculated thus to cause the engine to act entirely, and more effectively, as a brake, and cause the engine to be effective to bring the vehicle or machine to an absolute stop, if foot-plate 12 is held down that long.

Now, I take the foot off foot-plate 12, and immediately the spring 15 forces push-rod 10 and foot-plate 12 back to their normal off foot-throttle position, as determined by hand or dash throttle setting. And by this same force upon push-rod 10 the spring 15, acting through push-rod 10 and through gear wheel 4, fulcrummed by shaft 5 and its connections through the yoke assembly, Fig. 7, against the top of slot 20, the push-rod 9 and its connections are brought back to normal off foot-throttle position, as determined by hand or dash throttle setting.

The mechanism, the parts and mode of operation of which I have just described, comprise the means by which object designated the first is carried out.

When my mechanism is used as is an ordinary foot throttle, the two push rods and their respective foot plates maintain the relative positions illustrated by Figures 1, 2, 3, 5 and 10. That is to say, foot-plates 11 and 12 are in the same horizontal plane or substantially so.

Figures 1, 3 and 10 show the position of the parts of my mechanism at the closed-throttle position of the foot mechanism, as hereinbefore mentioned. They also show the exact relative position of the foot plates, push rods, gear wheel, and fulcrum-and-check yoke, with respect to each other, that would exist if foot-plate 11 and its push rod 9 were pressed say half way down, acting as a simple foot throttle, as hereinbefore explained. Then the parts mentioned would simply be lower down in the housing 1, Fig. 1,—the spring 15 would be partly depressed, the guide lugs 17 would be part way down the slots 20, the ratchet lugs 18 would be opposite teeth that are lower down in the slots 20, the carburetor valve would be part way open, and the vehicle would be traveling at say 25 miles an hour. With the foot-plate 11 engaging the stop 13, and with the parts in this half-way-down position, I tip the foot and put a slightly greater pressure upon foot-plate 12 and cause its depression below foot-plate 11 the distance approximately as illustrated by Figure 4, holding my foot on both plates, but which is tipped. The engaging of the ratchet lugs 18 in the teeth 8 of slots 20 is caused to take place, in the manner and way hereinbefore explained in connection with object designated the first. Then, so long as such uneven position of the foot is maintained, as was sufficient to cause the engaging of the fulcrum-and-check yoke with the teeth of the housing, just so long will the entire foot-throttle mechanism remain locked against any additional up and down foot pressure. The foot position for this continued locking action must be maintained unevenly upon the foot plate 12, or tipped. (A pressure upon foot-plate 12 alone, in this mechanism, will cause reverse motion to be imparted to push-rod 9 at whatever position of throttle travel the parts may be.)

In my present invention this locking action of the parts by uneven depression of the foot-plates may be imparted even at closed-foot-throttle position, and therefore at the slightest opening, whereas, in my other application hereinbefore referred to the reverse action could be imparted only at the closed-foot-throttle position of the parts, instead of in any position, as in this mechanism, and the locking could be imparted only at a point slightly out of the closed-foot-throttle position. In that mechanism, however, carburetor connections were provided such that regulation by hand or dash throttle did not interfere with the position of the foot-throttle foot plates or push rods. This mechanism, herein described, is intended to be adapted to use with the ordinary foot-and-hand or foot-and-dash throttle installations most commonly used at this time, without substantial change in those installations.

Immediately the operator equalizes his foot pressure upon the foot plates, 11 and 12, then the push-rod 9 is unlocked again, and remains under direct foot control. Then the same tilting again, will cause a similar locking. Over bad roads the operator maintains that tilted position of his foot upon the foot-throttle, with the greater pressure upon foot-plate 12, at whatever throttle opening he desires. And the operator's foot, thus slightly tilted, and upon which he may put part of his weight in a bad place on the road, if he wishes, is in a rather natural position of repose.

To summarize: Having an automobile traveling at say 25 miles an hour, on a rough road, the operator may have his foot slightly tilted to the right, bearing upon both foot plates, 11 and 12, but with the greater force upon 12. (Little force is required, though considerable force, such as might be brought to bear in negotiating rough roads, would not disturb the mechanism.) His foot-throttle will be locked against any such downward pressure, so long as he maintains that unequal pressure upon foot-plate 12 and its push-rod 10. The operator wishes to come to almost a full stop at the top of a near-by grade, and he also wishes, we will say, to use his engine as an effective brake down the grade. He takes all pressure off of foot-plates 11 and 12; the foot-throttle mechanism unlocks itself, by the action of spring 15 pressing upwards upon push-rod 10, and by the same means the foot-plates 11 and 12 are returned to their normal off foot-throttle position. The engine is still getting some fuel, by reason of a setting of the hand throttle lever 32, Fig. 10, for idling and slow running. The operator then moves his foot to the right sufficiently to miss foot-plate 11 entirely, and he applies foot-pressure to foot-plate 12 and push rod 10. A reverse, or upward, motion is thereby imparted to push-rod 9 and its carburetor connections, through gear wheel 4, fulcrummed upon its eccentric shaft 5, acting through the parts 6 and 7 and the teeth 18 against the teeth 8 supported by the framework of the automotive vehicle. By such means the operator is enabled to shut off all fuel supply to the engine and to use the engine as a brake at all speeds, without his having to modify his hand or dash throttle setting before and to remember to reset it afterwards. In practice at the present time the brakes are used in preference to bothering with changing the hand-throttle setting, and the engine is used as a brake only at the higher speeds and hardly ever to bring the vehicle to anywhere near the speed, for instance, of a person walking or to hold the machine at slow speed down a grade.

I have, in my Figure 10, shown a foot stop, 37, against which the operator may bring his foot in order accurately and positively to miss foot-plate 11 when desiring to get the reverse foot-throttle action. An adjustable extension upon foot-plate 12 might be used for the same purpose. Neither is absolutely necessary.

I have endeavored to point out clearly the differences between my present invention and the invention described in my previous application, they both having substantially the same primary objects. I have heard of no other devices of this character.

I contemplate that I may desire on some automotive installations to put linkage connections between the geared parts of push-rods 9 and 10 and the foot plates 11 and 12, respectively; perhaps to use foot-levers instead of such plates; and perhaps to use foot-levers and a pulling action of rod 9 to open the throttle, instead of a pushing action, with a reversal of the entire mechanism comprised in the housing 1.

I claim:

1. In a fuel feed control for automotive engines, a carburetor valve crank, a through foot-throttle push-rod operatively connected with said valve crank, a hand operated means also for operating said valve crank and co-acting with said through push-rod through a connection that slides freely in one direction from a given point and is elastic in the other direction, a second push-rod adjacent to the first and bearing a stop such that downward movement of the through push-rod depresses said second push-rod, a spring to return said push rods and connections to normal off position, a gear wheel operatively in mesh with both said push rods and having an off-center shaft only, and an expansible fulcrum-and-check yoke journaled on said off-center shaft, catches and guide lugs on said yoke, and side plates having slots, respectively, co-acting with the guide lugs and catches on said yoke.

2. In a fuel feed control for automotive engines, a carburetor valve crank, a through foot-throttle push-rod operatively connected with said crank, a second push-rod adjacent to the first and bearing a stop such that downward movement of the through push-rod depresses said second push-rod, a spring to return said push rods and their connections to normal off position, a gear wheel operatively in mesh with both said push rods and having an off-center shaft only, and an expansible fulcrum-and-check yoke journaled on said off-center shaft, catches and guide lugs on said yoke, and side plates having slots, respectively, co-acting with the guide lugs and catches on said yoke.

3. In a fuel feed control for automotive engines, a carburetor valve crank, a through foot-throttle push-rod operatively and adjustably connected with said valve crank, a second push-rod adjacent to the first, a stop on one of said push rods so arranged that downward movement of the through push-rod depresses said second push-rod, a spring to return said push rods and their connections to normal off position, a gear wheel operatively in mesh with both said push rods and having an off-center shaft only, and an expansible fulcrum-and-check yoke journaled on said off-center shaft, catches and guide lugs of said yoke, and side plates having slots, respectively, co-acting with the guide lugs and catches on said yoke.

4. In a foot accelerator mechanism for automobiles, a cross member having an off-center shaft, two reciprocating members operatively connected to the cross member at its edges, one of which said reciprocating members is connected with the carburetor, an expansible fulcrum-and-check yoke journaled upon and co-acting with the shaft in said cross member, guide lugs, one on each side, and a ratchet lug, on said yoke, and two slotted side plates co-acting with said guide lugs and ratchet lug.

5. In an accelerator mechanism of the kind described, the combination with a wheel having an off-center shaft and operatively connected with two push rods, bearing foot plates, one of which said rods is connected with the carburetor, of an expansible fulcrum-and-check yoke Figure 7, guide lugs and a ratchet catch on said yoke, and side plates bearing slots and catches co-acting, respectively, with said guide lugs and ratchet catch.

6. In a foot accelerator mechanism for automobiles, the combination of a foot-operated push-rod, operatively connected to the carburetor, an adjacent foot-operated push-rod, and a gear wheel operatively in mesh with said push rods and having off-center crank arms with fulcrum means connected thereto, said adjacent push-rod and said gear and fulcrum means sliding up and down as a unit with the first-named push-rod when both rods are caused to slide simultaneously in the same direction.

SIMON BARLOW.